United States Patent
Lee et al.

(10) Patent No.: US 12,546,237 B2
(45) Date of Patent: Feb. 10, 2026

(54) SHIP COGENERATION SYSTEM USING WASTE HEAT OF LNG ENGINE SHIP RECOVERED THROUGH ECONOMIZER

(71) Applicant: KOREA INSTITUTE OF OCEAN SCIENCE & TECHNOLOGY, Busan (KR)

(72) Inventors: Ho Saeng Lee, Sokcho-si (KR); Seung Taek Lim, Sokcho-si (KR); Se Gyu Kim, Uljin-gun (KR); Jong Beom Seo, Daejeon (KR); Jung Hyun Moon, Sokcho-si (KR)

(73) Assignee: KOREA INSTITUTE OF OCEAN SCIENCE & TECHNOLOGY, Busan (KR)

( * ) Notice: Subject to any disclaimer, the term of this patent is extended or adjusted under 35 U.S.C. 154(b) by 55 days.

(21) Appl. No.: 18/622,374

(22) Filed: Mar. 29, 2024

(65) Prior Publication Data
US 2024/0240576 A1    Jul. 18, 2024

Related U.S. Application Data

(63) Continuation of application No. PCT/KR2023/012408, filed on Aug. 22, 2023.

(30) Foreign Application Priority Data

Oct. 20, 2022    (KR) .......... 10-2022-0135912

(51) Int. Cl.
*F01K 23/06*    (2006.01)
*F01K 15/04*    (2006.01)
(Continued)

(52) U.S. Cl.
CPC ............ *F01K 23/065* (2013.01); *F01K 15/04* (2013.01); *F01K 23/10* (2013.01); *F22B 1/1807* (2013.01)

(58) Field of Classification Search
CPC ........ F01K 23/065; F01K 15/04; F01K 23/10; F22B 1/1807
See application file for complete search history.

(56) References Cited

U.S. PATENT DOCUMENTS 6,892,522 B2 *    5/2005    Brasz ............... F01K 23/10
                                                60/39.181
9,945,267 B2 *    4/2018    Adachi ............. F01K 25/08
(Continued)

FOREIGN PATENT DOCUMENTS

JP    2012-149541 A    8/2012
KR    2013-0032221 A    4/2013
(Continued)

*Primary Examiner* — Hoang M Nguyen
(74) *Attorney, Agent, or Firm* — Dinsmore & Shohl LLP

(57) ABSTRACT

Proposed is a ship cogeneration system using waste heat of an LNG engine ship recovered through an economizer. More particularly, proposed is a ship cogeneration system using waste heat of an LNG engine ship recovered through an economizer. The ship cogeneration system is configured to generate electric power by recovering waste heat generated from an LNG engine and providing high-temperature and high-pressure steam discharged from the economizer to an evaporator of an organic Rankine cycle. The ship cogeneration system is capable of removing soot generated on a contact surface between the exhaust gas of the LNG engine and the economizer by using some of the high-temperature and high-pressure steam.

4 Claims, 2 Drawing Sheets

(51) Int. Cl.
*F01K 23/10* (2006.01)
*F22B 1/18* (2006.01)

(56) References Cited

U.S. PATENT DOCUMENTS

| | | | | |
|---|---|---|---|---|
| 2014/0096522 | A1* | 4/2014 | Kirchner | F01K 7/34 |
| | | | | 60/648 |
| 2014/0333139 | A1* | 11/2014 | Vandor | F01K 5/00 |
| | | | | 307/69 |
| 2014/0373542 | A1* | 12/2014 | Yanagi | F01K 7/02 |
| | | | | 60/671 |
| 2015/0285103 | A1 | 10/2015 | Tanaka et al. | |
| 2016/0281542 | A1* | 9/2016 | Adachi | F01K 25/08 |
| 2017/0131027 | A1* | 5/2017 | Mak | F25J 1/0285 |

FOREIGN PATENT DOCUMENTS

| | | |
|---|---|---|
| KR | 2013-0103175 A | 9/2013 |
| KR | 2014-0042323 A | 4/2014 |
| KR | 10-2530054 B1 | 5/2023 |

\* cited by examiner

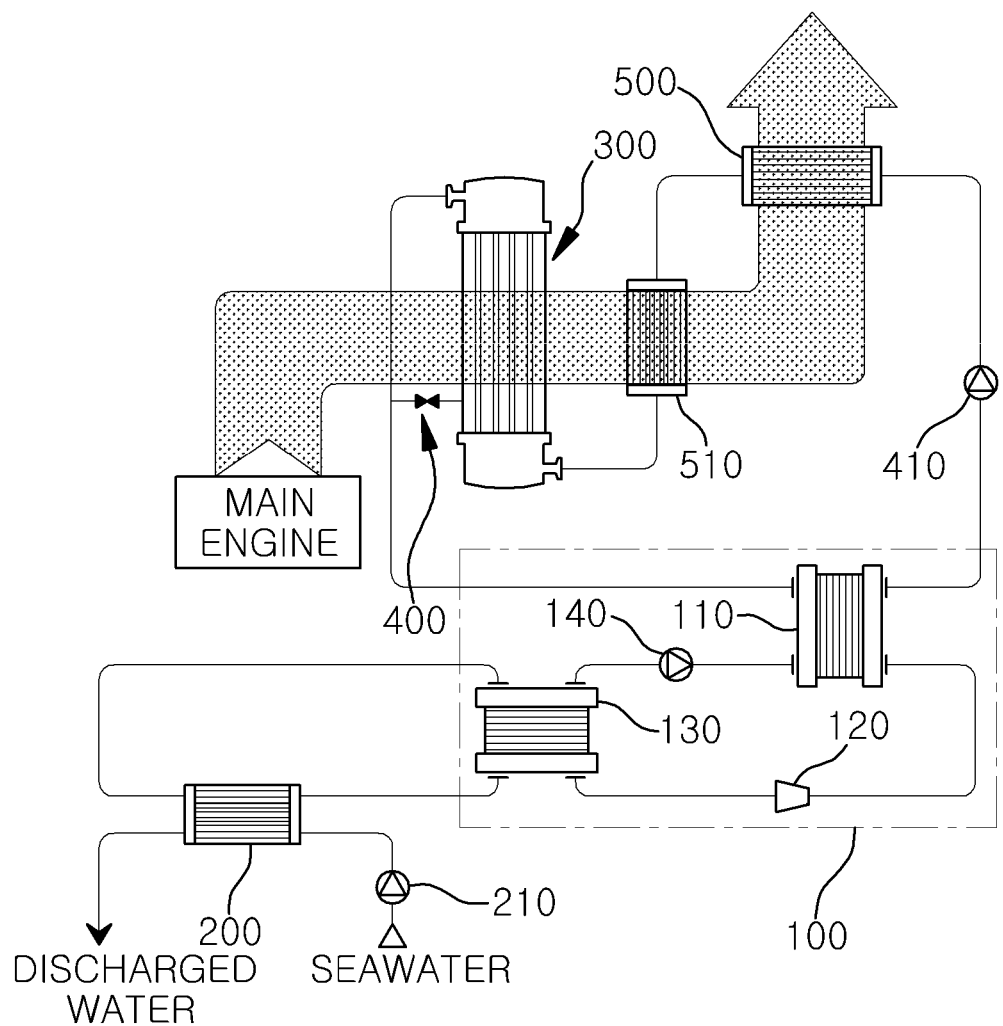
[FIG. 1]

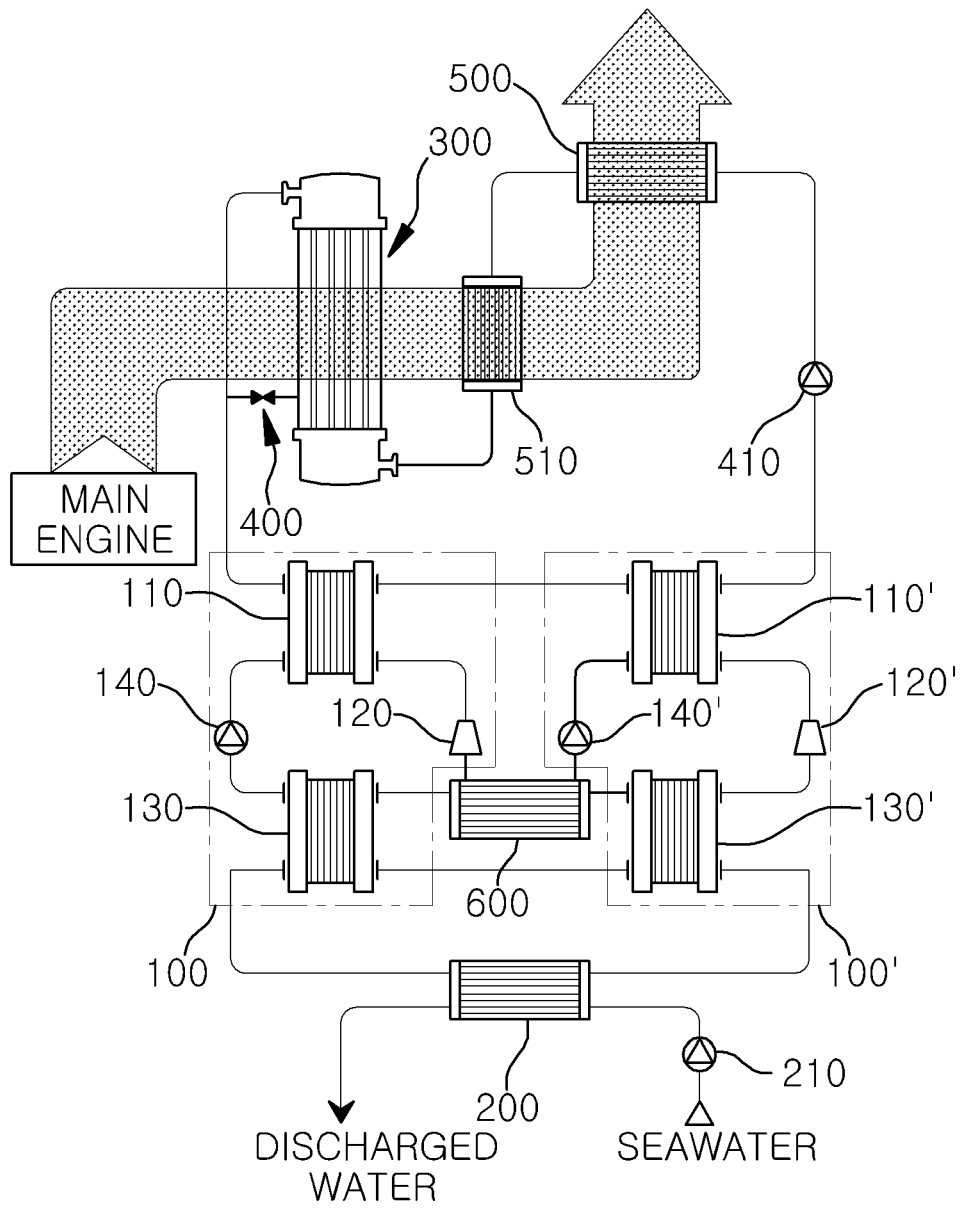
[FIG. 2]

SHIP COGENERATION SYSTEM USING WASTE HEAT OF LNG ENGINE SHIP RECOVERED THROUGH ECONOMIZER

CROSS-REFERENCE TO RELATED APPLICATIONS

This application is a continuation of International Application No. PCT/KR2023/012408 filed on Aug. 22, 2023, which claims priority to Korean Application No. 10-2022-0135912 filed on Oct. 20, 2022, the entire contents of which are herein incorporated by reference.

TECHNICAL FIELD

The present disclosure relates to a ship cogeneration system using waste heat of an LNG engine ship recovered through an economizer. More particularly, the present disclosure relates to a ship cogeneration system using waste heat of an LNG engine ship recovered through an economizer, the ship cogeneration system being configured to generate electric power by recovering waste heat generated from an LNG engine and providing high-temperature and high-pressure steam discharged from the economizer to an evaporator of an organic Rankine cycle, and being capable of removing soot generated on a contact surface between the exhaust gas of the LNG engine and the economizer by using some of the high-temperature and high-pressure steam.

BACKGROUND ART

Recently, as a part of the realization of an eco-friendly ship specified by International Maritime Organization (IMO), the development of an engine that uses natural gas such as LNG as a fuel is underway, and the supply of the engine is being prepared. In a conventional diesel engine, high-temperature steam production is required for fuel heating, and such steam supplies heat by utilizing exhaust gas waste heat generated in a ship. However, a ship that uses LNG as a fuel does not need fuel heating, so that more waste heat than exhaust gas waste heat generated in a conventional diesel-type ship is capable of being utilized.

In addition, high-temperature exhaust gas generated from a main engine of an LNG ship may be heat-exchanged with high-density stable water, so that the high-temperature exhaust gas may be utilized as a heat source of a modularized organic Rankine cycle power generation facility. Since water has high density and has large latent heat, there is an advantage that a tube volume of an economizer is capable of being minimized in a process of recovering exhaust heat.

DOCUMENT OF RELATED ART

Patent Document (Patent Document 0001) Korean Patent Application Publication No. 10-2012-0110709 (title of the invention: POWER GENERATION SYSTEM OF ORGANIC RANKINE CYCLE USING WASTE HEAT)

SUMMARY

Technical Problem

Accordingly, the present disclosure has been made keeping in mind the above problems occurring in the related art, and an objective of the present disclosure is to provide a ship cogeneration system using waste heat of an LNG engine ship recovered through an economizer, the ship cogeneration system being capable of maximizing the heat recovery rate of exhaust gas generated from an LNG engine.

Another objective of the present disclosure is to provide a ship cogeneration system using waste heat of an LNG engine ship recovered through an economizer, the ship cogeneration system being capable of maximizing energy conversion.

Technical Solution

In order to achieve the objectives described above, according to an aspect of the present disclosure, there is provided a ship cogeneration system using waste heat of an LNG engine ship recovered through an economizer, the ship cogeneration system including an organic Rankine cycle 100 configured to use high-temperature and high-pressure steam as a heat source and to use fresh water as a heat sink, the high-temperature and high-pressure steam being generated by an economizer 300 which is mounted on a side of an exhaust port of the LNG engine ship and which uses exhaust gas, as a heat source, generated from a main engine so as to heat-exchange with water so that the high-temperature and high-pressure steam is generated, the fresh water being heat-exchanged through a seawater heat exchanger 200, wherein the organic Rankine cycle includes: an evaporator 110 configured to use the high-temperature and high-pressure steam, as the heat source, generated by the economizer; a turbine generator 120 configured to generate electric power by being rotated by a refrigerant that is evaporated by the evaporator and then discharged; a condenser 130 configured to liquefy the refrigerant discharged from the turbine generator by using the fresh water, as a heat sink, heat-exchanged through the seawater heat exchanger; and a circulation pump 140 configured to compress the refrigerant discharged from the condenser and to provide the refrigerant to the evaporator, and further includes a circulation pump 410 configured to circulate a fluid discharged from the evaporator to the economizer.

In order to achieve the objectives described above, according to another aspect of the present disclosure, there is provided a ship cogeneration system using waste heat of an LNG engine ship recovered through an economizer, the ship cogeneration system including: a first organic Rankine cycle 100 configured to use high-temperature and high-pressure steam as a heat source and to use fresh water as a heat sink, the high-temperature and high-pressure steam being generated by an economizer 300 which is mounted on a side of an exhaust port of the LNG engine ship and which uses an exhaust gas, as a heat source, generated from a main engine so as to heat-exchange with water so that the high-temperature and high-pressure steam is generated, the fresh water being heat-exchanged through a seawater heat exchanger 200; and a second organic Rankine cycle 100' configured to use a fluid as a heat source and to use the fresh water as a heat sink, the fluid being used as a heat source in the first organic Rankine cycle and then discharged, the fresh water being used as a heat sink in the first organic Rankine cycle and then discharged, wherein the first organic Rankine cycle includes: a first evaporator 110 configured to use the high-temperature and high-pressure steam, as the heat source, generated by the economizer; a first turbine generator 120 configured to generate electric power by being rotated by a refrigerant that is evaporated by the first evaporator and then discharged; a first condenser 130 configured to liquefy the refrigerant discharged from the first turbine generator by using the fresh water, as a heat sink, heat-exchanged through the seawater heat exchanger; and a circulation pump 140 configured to compress the refrigerant discharged from the first condenser and to provide the compressed refrigerant to the first evaporator, the second organic Rankine cycle includes: a second evaporator 110' configured to use the fluid as a heat source, the fluid being used as a heat sink in the first evaporator and then discharged; a second turbine generator 120' configured to generate electric power by being rotated by the refrigerant that is evaporated by the second evaporator and then discharged; a second condenser 130' configured to liquefy the refrigerant discharged from the second turbine generator by using the fluid as a heat sink, the fluid being used as a heat sink in the first condenser and then discharged; and a circulation pump 140' configured to compress the refrigerant discharged from the second condenser and to provide the compressed refrigerant to the second evaporator, further comprises a heat exchanger 600 configured to heat-exchange the refrigerant discharged from the second condenser by using the refrigerant which is discharged from the first turbine generator and which has a high-temperature, the heat exchanger being configured to provide the refrigerant discharged from the second condenser and heat-exchanged to the circulation pump 140', and further comprises a circulation pump 410 configured to circulate the fluid discharged from the second evaporator to the economizer.

In the ship cogeneration system using waste heat of an LNG engine ship recovered through the economizer according to the aspects of the present disclosure, some of the high-temperature and high-pressure steam generated from the economizer 300 may be provided to a contact surface between the exhaust gas and the economizer, thereby removing soot.

In the ship cogeneration system using waste heat of an LNG engine ship recovered through the economizer according to the aspects of the present disclosure, the fluid supplied to the economizer 300 through the circulation pump 410 may be preheated by a first preheater 500 and a second preheater 510, the first preheater and the second preheater being configured to use the exhaust gas, as a heat source, generated from the main engine.

In the ship cogeneration system using waste heat of an LNG engine ship recovered through the economizer according to the aspects of the present disclosure, the seawater heat exchanger 200 may be configured to provide the fresh water that is heat-exchanged by using seawater collected by a circulation pump 210 to the first condenser 130 so that the heat-exchanged fresh water is used as a heat sink, the fresh water used as a heat sink in the first condenser and then discharged may be provided to the second condenser 130' so that the discharged fresh water is used as a heat sink, and the fresh water used as a heat sink in the second condenser and then discharged may be provided to the seawater heat exchanger.

Advantageous Effects

According to the ship cogeneration system using waste heat of an LNG engine ship recovered through the economizer according to the aspects of the present disclosure, the ship cogeneration system includes the organic Rankine cycle using high-temperature and high-pressure steam as a heat source and using fresh water as a heat sink, the high-temperature and high-pressure steam being generated by the economizer 300 which is mounted on the side of the exhaust port of the LNG engine ship and which uses an exhaust gas, as a heat source, generated from the main engine so as to heat-exchange with water so that the high-temperature and high-pressure steam is generated, the fresh water being heat-exchanged through the seawater heat exchanger 200. Furthermore, a fluid supplied to the economizer 300 through the circulation pump 410 is preheated by the first preheater 500 and the second preheater 510 that are using the exhaust gas, as a heat source, generated from the main engine, so that there is an excellent effect that heat recovery rate of the exhaust gas generated from the LNG engine is capable of being maximized.

According to the ship cogeneration system using waste heat of an LNG engine ship recovered through the economizer according to the aspects of the present disclosure, the first and second organic Rankine cycles using the high-temperature and high-pressure steam as a heat source are connected in series with each other, the high-temperature and high-pressure steam being generated by the economizer 300 which is mounted on the side of the exhaust port of the LNG engine ship and which uses the exhaust gas, as a heat source, generated from the main engine so as to heat-exchange with water so that the high-temperature and high-pressure steam is generated. Therefore, there is an excellent effect that energy conversion is capable of being maximized.

DESCRIPTION OF DRAWINGS

FIG. 1 is a view illustrating a configuration of a ship cogeneration system using waste heat of an LNG engine ship recovered through an economizer according to a first embodiment of the present disclosure.

FIG. 2 is a view illustrating a configuration of the ship cogeneration system using waste heat of an LNG engine ship recovered through the economizer according to a second embodiment of the present disclosure.

DETAILED DESCRIPTION

In describing embodiments of the present disclosure, if it is determined that the detailed description of the known technology related to the present disclosure may unnecessarily obscure the gist of the present disclosure, the detailed description thereof will be omitted. In addition, the terms to be described later are terms defined in consideration of functions in the present disclosure, which may vary depending on the intention of a user or an operator, or custom. Therefore, the definition should be made on the basis of the content throughout the specification. The terminology used in the detailed description is intended only to describe the embodiments of the present disclosure and should in no way be construed as limiting. Unless the context clearly indicates otherwise, the expressions in the singular form include the meaning of the plural form. In the description, expressions such as "comprising" or "provided" are intended to indicate certain features, numbers, steps, acts, elements, a combination thereof, and it should not be construed as excluding the presence or possibility of one or more other characteristics, numbers, steps, acts, elements, or any combination thereof other than those described.

In each system shown in the drawings, elements in some instances may each have the same reference number or a different reference number to suggest that the elements represented may be different or similar. However, elements may have different implementations and work with some or all of the systems shown or described herein. The various elements shown in the drawing may be the same or different.

Which one is referred to as the first element or which one is called the second element is arbitrary.

In the specification, when one component "transmits", "delivers", or "provides" data or signals to another component, it not only means that one component transmits data or signals directly to another component, but also means that one component transmits data or signals to another component via at least one other component.

Hereinafter, embodiments of the present disclosure will be described in detail with reference to the accompanying drawings.

First Embodiment

FIG. 1 is a view illustrating a configuration of a ship cogeneration system using waste heat of an LNG engine ship recovered through an economizer according to a first embodiment of the present disclosure.

As illustrated in FIG. 1, a ship cogeneration system using waste heat of an LNG engine ship recovered through an economizer according to a first embodiment of the present disclosure includes an organic Rankine cycle 100 and peripheral devices.

The organic Rankine cycle 100 serves to generate electric power by using high-temperature and high-pressure steam as a heat source and using fresh water as a heat sink, the high-temperature and high-pressure steam being generated by an economizer 300 which is mounted on a side of an exhaust port of the LNG engine ship and which uses an exhaust gas, as a heat source, generated from a main engine so as to heat-exchange with water so that the high-temperature and high-pressure steam is generated, the fresh water being heat-exchanged through a seawater heat exchanger 200. The organic Rankine cycle 100 includes an evaporator 110, a turbine generator 120, a condenser 130, and a circulation pump 140.

The evaporator 110 serves to evaporate a refrigerant by using the high-temperature and high-pressure steam as a heat source, the steam being generated by the economizer 300 mounted on the side of the exhaust port of the LNG ship.

The turbine generator 120 serves to generate electric power by being rotated by the refrigerant that is evaporated by the evaporator 110 and then discharged, and includes a turbine configured to be rotated by the discharged refrigerant and a generator configured to generate electric power when the turbine is rotated.

The condenser 130 uses fresh water that is heat-exchanged through the seawater heat exchanger 200 as a heat sink, thereby serving to liquefy the refrigerant discharged from the turbine generator 120.

The circulation pump 140 serves to compress the refrigerant discharged from the condenser 130 and to provide the compressed refrigerant to the evaporator 110.

The peripheral devices include the seawater heat exchanger 200, a circulation pump 210, the economizer 300, a steam valve 400, a first preheater 500, a second preheater 510, and a circulation pump 410.

The seawater heat exchanger 200 serves to heat-exchange fresh water by using seawater collected by the circulation pump 210 and to provide the fresh water, as a heat sink, to the condenser 130.

The circulation pump 210 serves to collect seawater and to provide the seawater to the seawater heat exchanger 200.

The economizer 300 mounted on the side of the exhaust port of the LNG engine ship serves to use exhaust gas at a temperature of equal to or more than 400 degrees Celsius, as a heat source, generated from the main engine so as to generate high-temperature and high-pressure steam generated by heat-exchanging water, and serves to provide the steam to the evaporator 110.

The steam valve 400 is mounted on a pipe that branches some of the high-temperature and high-pressure steam generated from the economizer 300, and is used for removing soot accumulated on a contact surface between the exhaust gas and the economizer 300. Soot contained in the exhaust gas is attached to the economizer 300, which causes problems such as a decrease in heat capacity and a pressure loss of exhaust pressure. When the steam valve 400 is opened, some of the high-temperature and high-pressure steam from the economizer 300 is provided to the contact surface between exhaust gas and the economizer 300, so that the soot attached to the contact surface is removed. Accordingly, the problems such as a decrease in heat capacity and a loss of exhaust pressure due to the soot attached to economizer 300 may be solved.

The first preheater 500 serves to preheat a fluid supplied to the economizer 300 through the circulation pump 410 by using the exhaust gas, as a heat source, generated from the main engine.

The second preheater 510 serves to preheat the fluid that has passed through the first preheater 500 by using the exhaust gas as a heat source, and serves to provide the fluid to the economizer 300.

The circulation pump 410 serves to circulate the fluid between the evaporator 110 and the first preheater 500.

According to the ship cogeneration system using waste heat of an LNG engine ship recovered through the economizer according to the first embodiment of the present disclosure as described above, the ship cogeneration system includes the organic Rankine cycle using high-temperature and high-pressure steam as a heat source and using fresh water as a heat sink, the high-temperature and high-pressure steam being generated by the economizer 300 which is mounted on the side of the exhaust port of the LNG engine ship and which uses an exhaust gas, as a heat source, generated from the main engine so as to heat-exchange with water so that the high-temperature and high-pressure steam is generated, the fresh water being heat-exchanged through the seawater heat exchanger 200. Furthermore, a fluid supplied to the economizer 300 through the circulation pump 410 is preheated by the first preheater 500 and the second preheater 510 that are using the exhaust gas, as a heat source, generated from the main engine, so that heat recovery rate of the exhaust gas generated from the LNG engine may be maximized.

Second Embodiment

FIG. 2 is a view illustrating a configuration of the ship cogeneration system using waste heat of an LNG engine ship recovered through the economizer according to a second embodiment of the present disclosure.

As illustrated in FIG. 2, the ship cogeneration system using waste heat of an LNG engine ship recovered through the economizer according to a second embodiment of the present disclosure includes a first organic Rankine cycle 100, a second organic Rankine cycle 100', and peripheral devices.

The first organic Rankine cycle 100 serves to generate electric power by using high-temperature and high-pressure steam as a heat source and using fresh water as a heat sink, the high-temperature and high-pressure steam being generated by the economizer 300 which is mounted on a side of an exhaust port of the LNG engine ship and which uses an exhaust gas, as a heat source, generated from a main engine so as to heat-exchange with water so that the high-temperature and high-pressure steam is generated, the fresh water being heat-exchanged through the seawater heat exchanger 200. The first organic Rankine cycle 100 includes a first evaporator 110, the turbine generator 120, a first condenser 130, and the circulation pump 140.

The first evaporator 110 serves to evaporate a refrigerant by using the high-temperature and high-pressure steam as a heat source, the steam being generated by the economizer 300 mounted on the side of the exhaust port of the LNG ship.

The turbine generator 120 serves to generate electric power by being rotated by the refrigerant that is evaporated by the first evaporator 110 and then discharged, and includes the turbine configured to be rotated by the discharged refrigerant and the generator configured to generate electric power when the turbine is rotated.

The first condenser 130 uses fresh water that is heat-exchanged through the seawater heat exchanger 200 as a heat sink, thereby serving to liquefy the refrigerant discharged from the turbine generator 120.

The circulation pump 140 serves to compress the refrigerant discharged from the first condenser 130 and to provide the compressed refrigerant to the fist evaporator 110.

The second organic Rankine cycle 100' serves to generate electric power by using a fluid as a heat source and using fresh water as a heat sink, the fluid being used as a heat source in the first evaporator 110 of the first organic Rankine cycle 100 and then discharged, the fresh water being used as a heat sink in the first evaporator 110 of the first organic Rankine cycle 100 and then discharged. The second organic Rankine cycle 100' includes a second evaporator 110', a second turbine generator 120', a second condenser 130', and a circulation pump 140'.

The second evaporator 110' serves to evaporate the refrigerant by using the fluid that is used as a heat sink in the first evaporator 110 and then discharged.

The second turbine generator 120' serves to generate electric power by being rotated by the refrigerant that is evaporated by the second evaporator 110' and then discharged, and includes a turbine configured to be rotated by the discharged refrigerant and a generator configured to generate electric power when the turbine is rotated.

The second condenser 130' serves to liquefy the refrigerant discharged from the second turbine generator 120' by using the fluid as a heat sink, the fluid being used as a heat sink in the first condenser 130 and then discharged.

The circulation pump 140' serves to compress the refrigerant discharged from the second condenser 130', and serves to provide the compressed refrigerant to the second evaporator 110'.

The peripheral devices include a heat exchanger 200, a circulation pump 210, the economizer 300, the steam valve 400, the first preheater 500, the second preheater 510, and a circulation pump 410.

The heat exchanger 600 serves to heat-exchange the refrigerant discharged from the second condenser 130' by using the high-temperature refrigerant discharged from the first turbine generator 120, and serves to provide the refrigerant discharged from the second condenser 130' to the circulation pump 140'. In addition, the heat exchanger 600 serves to reduce energy wasted through the heat-exchange between the low temperature refrigerant of the second organic Rankine cycle 100' and the high temperature refrigerant of the first organic Rankine cycle 100, and serves to reduce the volume of the condensers of each of the cycles.

The seawater heat exchanger 200 serves to heat-exchange fresh water by using seawater collected by the circulation pump 210, and serves to provide the fresh water, as a heat sink, to the first condenser 130.

The circulation pump 210 serves to collect seawater and to provide the seawater to the seawater heat exchanger 200.

The economizer 300 mounted on the side of the exhaust port of the LNG engine ship serves to use exhaust gas at a temperature of equal to or more than 400 degrees Celsius, as a heat source, generated from the main engine so as to generate high-temperature and high-pressure steam generated by heat-exchanging water, and serves to provide the steam to the first evaporator 110.

The steam valve 400 is mounted on a pipe that branches some of the high-temperature and high-pressure steam generated from the economizer 300, and is used for removing soot accumulated on a contact surface between the exhaust gas and the economizer 300. Soot contained in the exhaust gas is attached to the economizer 300, which causes problems such as a decrease in heat capacity and a pressure loss of exhaust pressure. When the steam valve 400 is opened, some of the high-temperature and high-pressure steam from the economizer 300 is provided to the contact surface between exhaust gas and the economizer 300, so that the soot attached to the contact surface is removed. Accordingly, problems such as a decrease in heat capacity and a loss of exhaust pressure due to the soot attached to economizer 300 may be solved.

The first preheater 500 serves to preheat a fluid supplied to the economizer 300 through the circulation pump 410 by using the exhaust gas, as a heat source, generated from the main engine.

The second preheater 510 serves to preheat the fluid that has passed through the first preheater 500 by using the exhaust gas as a heat source, and serves to provide the fluid to the economizer 300.

The circulation pump 410 serves to circulate the fluid between the second evaporator 110' and the first preheater 500.

According to the ship cogeneration system using waste heat of an LNG engine ship recovered through the economizer according to the second embodiment of the present disclosure as described above, the first and second organic Rankine cycles using the high-temperature and high-pressure steam as a heat source are connected in series with each other, the high-temperature and high-pressure steam being generated by the economizer 300 which is mounted on the side of the exhaust port of the LNG engine ship and which uses the exhaust gas, as a heat source, generated from the main engine so as to heat-exchange with water so that the high-temperature and high-pressure steam is generated. Therefore, energy conversion may be maximized.

In the drawings and specification, optimal embodiments are disclosed, and certain terms used herein are only for the purpose of describing the embodiments of the present disclosure and not to limit the meaning or limit the scope of the present disclosure as set forth in the claims. Therefore, it will be understood by a person skilled in the art to which the present disclosure pertains that various modifications and equivalent other embodiments are possible. Accordingly, the true technical protection scope of the present disclosure should be determined by the technical spirit of the appended claims.

The invention claimed is:

1. A ship cogeneration system using waste heat of an LNG engine ship recovered through an economizer, the ship cogeneration system comprising:

a first organic Rankine cycle (100) configured to use high-temperature and high-pressure steam as a heat source and to use fresh water as a heat sink, the high-temperature and high-pressure steam being generated by the economizer (300) which is mounted on a side of an exhaust port of the LNG engine ship and which uses an exhaust gas, as a heat source, generated from a main engine so as to heat-exchange with water so that the high-temperature and high-pressure steam is generated, the fresh water being heat-exchanged through a seawater heat exchanger (200); and a second organic Rankine cycle (100') configured to use a fluid as a heat source and to use the fresh water as the heat sink, the fluid being used as a heat source in the first organic Rankine cycle and then discharged, the fresh water being used as the heat sink in the first organic Rankine cycle and then discharged, wherein the first organic Rankine cycle comprises:

a first evaporator (110) configured to use the high-temperature and high-pressure steam, as the heat source, generated by the economizer;

a first turbine generator (120) configured to generate electric power by being rotated by a refrigerant that is evaporated by the first evaporator and then discharged;

a first condenser (130) configured to liquefy the refrigerant discharged from the first turbine generator by using the fresh water, as the heat sink, heat-exchanged through the seawater heat exchanger; and a first circulation pump (140) configured to compress the refrigerant discharged from the first condenser and to provide the compressed refrigerant to the first evaporator, the second organic Rankine cycle comprises:

a second evaporator (110') configured to use the fluid as a heat source, the fluid being used as the heat sink in the first evaporator and then discharged;

a second turbine generator (120') configured to generate electric power by being rotated by the refrigerant that is evaporated by the second evaporator and then discharged;

a second condenser (130') configured to liquefy the refrigerant discharged from the second turbine generator by using the fluid as the heat sink, the fluid being used as the heat sink in the first condenser and then discharged; and a second circulation pump (140') configured to compress the refrigerant discharged from the second condenser and to provide the compressed refrigerant to the second evaporator, further comprises a third heat exchanger (600) configured to heat-exchange the refrigerant discharged from the second condenser by using the refrigerant which is discharged from the first turbine generator and which has a high-temperature, the heat exchanger being configured to provide the refrigerant discharged from the second condenser and heat-exchanged to the second circulation pump (140'), and further comprises a third circulation pump (410) configured to circulate the fluid discharged from the second evaporator to the economizer.

2. The ship cogeneration system of claim 1, wherein the seawater heat exchanger (200) is configured to provide the fresh water that is heat-exchanged by using seawater collected by a fourth circulation pump (210) to the first condenser (130) so that the heat-exchanged fresh water is used as the heat sink, the fresh water used as the heat sink in the first condenser and then discharged is provided to the second condenser (130') so that the discharged fresh water is used as the heat sink, and the fresh water used as the heat sink in the second condenser and then discharged is provided to the seawater heat exchanger.

3. The ship cogeneration system of claim 1, wherein some of the high-temperature and high-pressure steam generated from the economizer (300) is provided to a contact surface between the exhaust gas and the economizer, thereby removing soot.

4. The ship cogeneration system of claim 1, wherein the fluid supplied to the economizer (300) through the third circulation pump (410) is preheated by a first preheater (500) and a second preheater (510), the first preheater and the second preheater being configured to use the exhaust gas, as a heat source, generated from the main engine.

* * * * *